(12) United States Patent
Ogawara (10) Patent No.: US 11,338,442 B2
(45) Date of Patent: May 24, 2022

(54) ROBOT APPARATUS, CONTROL METHOD FOR ROBOT APPARATUS, ARTICLE MANUFACTURING METHOD USING ROBOT APPARATUS, AND STORAGE MEDIUM

(71) Applicant: CANON KABUSHIKI KAISHA, Tokyo (JP)

(72) Inventor: Takayuki Ogawara, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 260 days.

(21) Appl. No.: 16/439,573

(22) Filed: Jun. 12, 2019

(65) Prior Publication Data

US 2019/0381669 A1    Dec. 19, 2019

(30) Foreign Application Priority Data

Jun. 19, 2018    (JP) .............................. JP2018-116498

(51) Int. Cl.
B25J 9/16        (2006.01)
B25J 13/08       (2006.01)

(52) U.S. Cl.
CPC ........... B25J 9/1694 (2013.01); B25J 9/1633 (2013.01); B25J 13/085 (2013.01)

(58) Field of Classification Search
CPC ...... B25J 9/1694; B25J 13/085; B25J 9/1687; B25J 13/08; B25J 9/16; B25J 19/02; B25J 9/1633; G05B 2219/40033; G05B 2219/40599; G05B 2219/39322; G05B 2219/40032
See application file for complete search history.

(56) References Cited

U.S. PATENT DOCUMENTS

| | | | | |
|---|---|---|---|---|
| 2013/0197696 A1* | 8/2013 | Nammoto | ............. | B25J 13/085 700/259 |
| 2017/0008171 A1* | 1/2017 | Iwatake | ................ | B25J 9/1687 |
| 2017/0014995 A1* | 1/2017 | Kato | .................... | B25J 15/0095 |
| 2017/0259431 A1* | 9/2017 | Takeuchi | ............... | B25J 9/1633 |
| 2018/0339414 A1* | 11/2018 | Taguchi | ................ | B25J 13/085 |

FOREIGN PATENT DOCUMENTS

JP    2009-125904 A    6/2009

OTHER PUBLICATIONS

English translation of Sakano, Tetsuro, JP-2009125904-A, Jun. 2009 (Year: 2009).*

* cited by examiner

*Primary Examiner* — Nicholas Kiswanto
*Assistant Examiner* — Danielle Marie Jackson
(74) *Attorney, Agent, or Firm* — Canon U.S.A., Inc., IP Division (57) ABSTRACT

A robot apparatus which does assembly by tilting a workpiece which is to be a fitting component, and bringing a part of a surface of the workpiece which is the fitting component and a part of a surface of a workpiece which is to be a fitted component, into contact with each other a plurality of times, when inserting the workpiece which is the fitting component into the workpiece which is the fitted component.

21 Claims, 5 Drawing Sheets

FIG.5G

ROBOT APPARATUS, CONTROL METHOD FOR ROBOT APPARATUS, ARTICLE MANUFACTURING METHOD USING ROBOT APPARATUS, AND STORAGE MEDIUM

BACKGROUND

Field of the Disclosure

The present disclosure relates to a robot apparatus.

Description of the Related Art

In recent years, in order to meet diversified needs of consumers, production automation at a production site requires a robot apparatus that can produce an article by holding various objects and assembling one object to another object. However, in a case where an article is assembled by a robot apparatus, the relative positions of an object to be operated on by the robot apparatus and an object to be assembled thereto need to be accurately managed in order to increase a chance of assembly success. Therefore, a positioning device that accurately determines the position of the object to be assembled is necessary, but this leads to a cost increase. It is therefore desirable that the chance of assembly success can be increased without using such a special apparatus.

Given these circumstances, Japanese Patent Application Laid-Open No. 2009-125904 discusses a related technology. In this technology, a fitting component held by a hand is tilted by a predetermined amount, and one corner portion of the fitting component is inserted into an opening portion of a component to be fitted. Subsequently, the corner portion is brought into contact with an inner surface of the component to be fitted by moving the fitting component in a Y direction. The fitting component is then moved in an X direction therefrom. The corner portion of the fitting component and a corner portion of the opening portion of the component to be fitted can thereby coincide with each other. The tilted fitting component is then returned to the original position, with reference to the coinciding corner portions of both components. This makes it possible to align the position of an inserted surface of the fitting component and the position of the opening portion without using a positioning device, so that the chance of assembly success can be increased.

However, in the technology discussed in Japanese Patent Application Laid-Open No. 2009-125904, the relative positions of the fitting component and the component to be fitted are aligned by making the corner portions of the respective components coincide with each other. Accordingly, no issue arises if the corner portions of the fitting component and the component to be fitted are angular. However, it is sometimes difficult to align the corner portions of the respective components if the corner portions are round.

SUMMARY

The present disclosure is directed to a robot apparatus that can increase the chance of article assembly success without using a positioning device, even when objects take various shapes.

According to an aspect of the present disclosure, a robot apparatus that performs a task while maintaining contact between a first object and a second object, includes a robot arm, a force detection unit configured to detect a force, and a control device configured to control the robot apparatus. The control device is configured to tilt the first object by a predetermined amount by operating the robot arm, bring the first object and the second object into contact with each other, bring a part of a first surface of the first object and a part of a first surface of the second object into contact with each other based on a detection value of the force detection unit, and bring a part of a second surface of the first object and a part of a second surface of the second object into contact with each other in a state where the part of the first surface of the first object and the part of the first surface of the second object are in contact with each other.

Further features of the present disclosure will become apparent from the following description of exemplary embodiments with reference to the attached drawings.

DESCRIPTION OF THE EMBODIMENTS

Exemplary embodiments of the present disclosure will be described below with reference to the attached drawings. Each of the exemplary embodiments to be described below is merely an example, and those skilled in the art can modify detailed configurations where appropriate, without departing from the scope of the present disclosure. In addition, numerical values described in the exemplary embodiments are reference values and are not intended to limit the present disclosure.

Figure 1A:
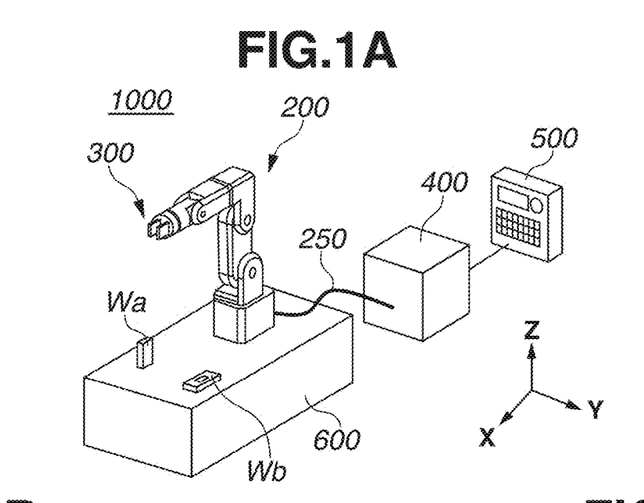
FIGS. 1A, 1B, and 1C are schematic diagrams illustrating a robot system according to a first exemplary embodiment.
Figure 1B:
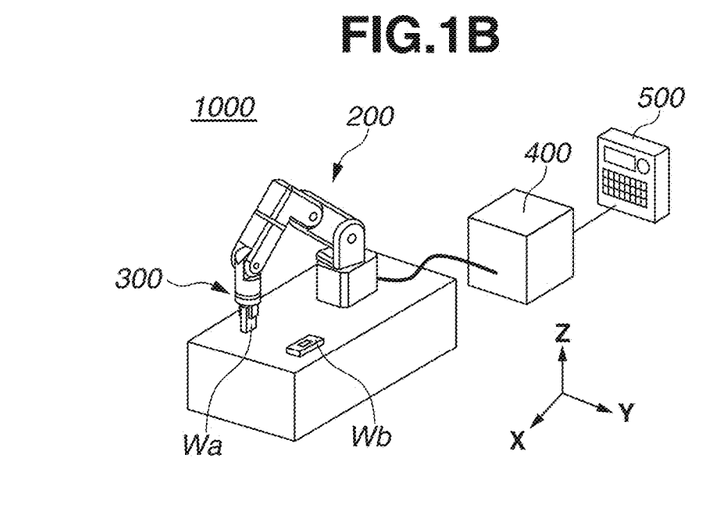
Figure 1C:
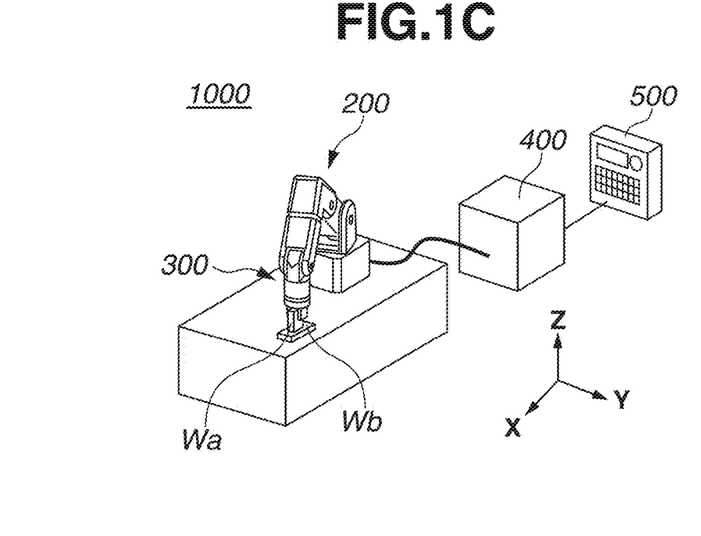

A first exemplary embodiment will be described below. FIGS. 1A, 1B, and 1C schematically illustrate a robot system 1000. The robot system 1000 includes a robot arm main body 200, an end effector 300, a stand 600, a control device 400, and an external input device 500, as illustrated in FIG. 1A.

The robot arm main body 200 is installed on the stand 600, and is provided with the end effector 300 disposed at one end (tip) of the robot arm main body 200. In the present exemplary embodiment, a robot hand including two finger portions will be described as an example of the end effector 300. While the robot hand including the finger portions is described as an example in the present exemplary embodiment, other mechanisms may be used that can work on a workpiece, such as an end effector that has an adsorption mechanism in place of the finger regions and holds a workpiece Wa with the adsorption mechanism.

The control device 400 includes a central processing unit (CPU) such as a microprocessor. The external input device 500 is connected to the control device 400. Further, the control device 400 is connected to the robot arm main body 200 and the end effector 300 via wiring 250.

A user inputs a command value into the control device 400, using the external input device 500. The control device 400 controls operation by providing a control value to each of the robot arm main body 200 and the end effector 300.

Further, the control device 400 has a read only memory (ROM) that stores a program for controlling drive units corresponding to various operations of the robot arm main body 200, and data necessary for control of those drive units. The control device 400 further has a random access memory (RAM). For example, data, setting values, and a program that are necessary for control of the robot arm main body 200 are loaded into the RAM. The RAM is also used as a working area for the CPU.

External devices including the external input device 500 are connected by a general-purpose input/output interface I/O. Examples of the external input device 500 include a teaching pendant.

An operation unit is disposed in the external input device 500. The operation unit includes operation keys for changing a posture (a position or an angle) of a joint of the robot arm main body 200, or moving a position such as a reference position of the end effector 300. When some kind of operation is performed on the operation unit of the external input device 500, the control device 400 controls the operation of the robot arm main body 200 and the end effector 300 via the wiring 250.

Further, the workpiece Wa and a workpiece Wb are each placed at a predetermined position on the stand 600. The workpiece Wa is rectangular, and is held by the end effector 300. The workpiece Wb is also rectangular, and has an opening portion into which the workpiece Wa is to be inserted. An article is assembled by inserting the workpiece Wa into this opening portion.

The positions of the respective workpieces Wa and Wb are arranged by a feeder (not illustrated). The feeder roughly manages and arranges positions of the workpieces. Further, the workpiece Wb is fixed so as not to move during the insertion of the workpiece Wa. In the present exemplary embodiment, the robot arm main body 200, the end effector 300, and the control device 400 may be collectively referred to as "robot apparatus".

FIG. 1B is a diagram illustrating a state where the robot arm main body 200 is operated so that the end effector 300 holds the workpiece Wa. FIG. 1C is a diagram illustrating a state where the workpiece Wa held by the end effector 300 is inserted into the workpiece Wb.

In this way, the robot arm main body 200 and the end effector 300 are operated such that the workpiece Wa is inserted into the workpiece Wb to manufacture the article.

Figure 2:
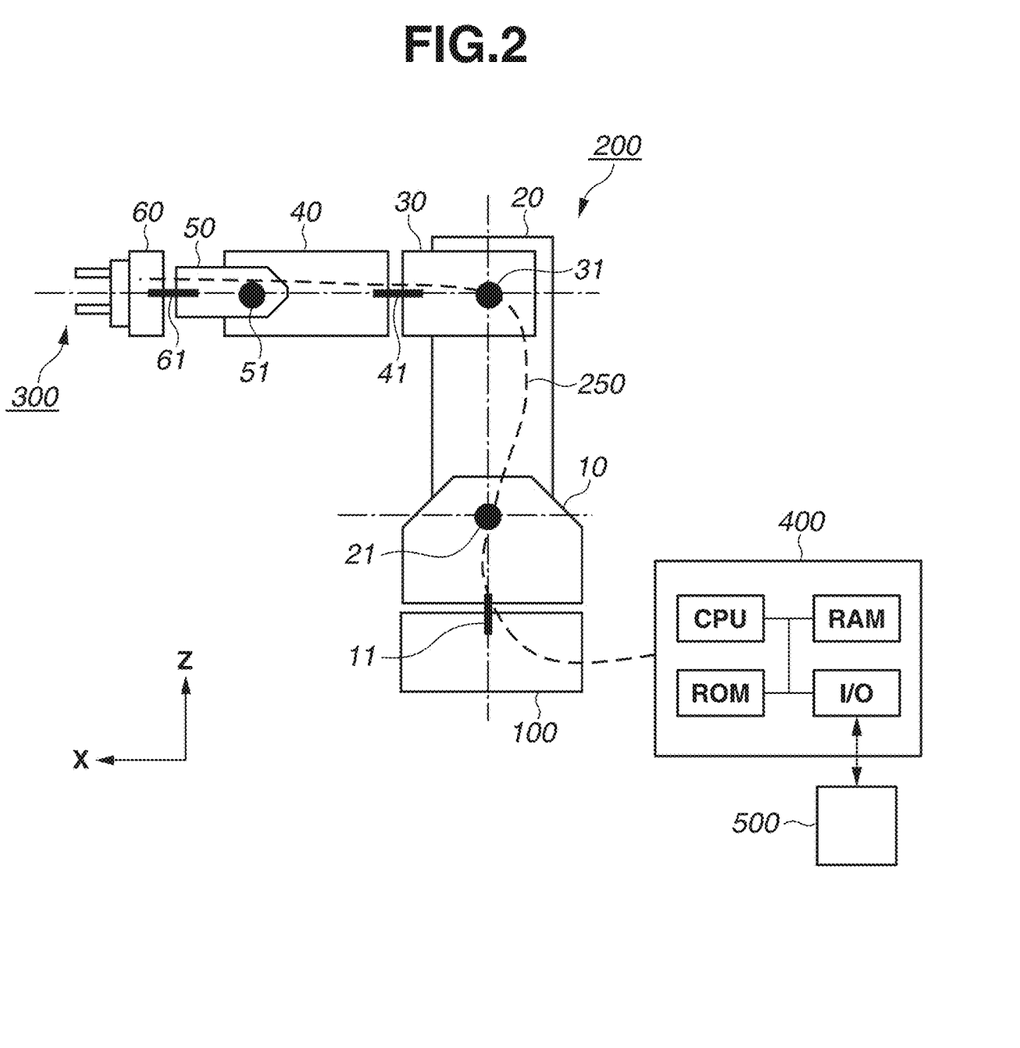
FIG. 2 is a schematic diagram illustrating a robot arm main body according to the first exemplary embodiment.

FIG. 2 is a diagram illustrating details of the robot arm main body 200.

As illustrated in FIG. 2, the robot arm main body 200 has, for example, a serial link configuration in which a plurality of links is interconnected via a plurality of joints (six axes). Links 10, 20, 30, 40, 50, and 60 of the robot arm main body 200 are driven via joints 11, 21, 31, 41, 51, and 61. Each of these joints has a motor 210 (FIG. 3) as a drive source as described below.

Further, each of the joints 11, 21, 31, 41, 51, and 61 is provided with an encoder 220 (FIG. 3) so that a rotation angle can be detected.

As illustrated in FIG. 2, the robot arm main body 200 has a base 100, and the base 100 and the link 10 are connected by the joint 11 that rotates around a rotation axis extending in a Z-axis direction. The joint 11 has, for example, a movable range of about ±180 degrees from the initial posture.

The link 10 and link 20 of the robot arm main body 200 are connected by the joint 21. The joint 21 has a rotation axis extending in a Y-axis direction in the illustrated state. Therefore, the joint 21 has, for example, a movable range of about ±80 degrees from the initial posture.

The link 20 and the link 30 of the robot arm main body 200 are connected by the joint 31. The joint 31 has a rotation axis extending in the Y-axis direction in the illustrated state. The joint 31 has, for example, a movable range of about ±70 degrees from the initial posture.

The link 30 and the link 40 of the robot arm main body 200 are connected by the joint 41. The joint 41 has a rotation axis extending in an X-axis direction in the illustrated state. The joint 41 has, for example, a movable range of about ±180 degrees from the initial posture.

The link 40 and the link 50 of the robot arm main body 200 are connected by the joint 51. The joint 51 has a rotation axis extending in the Y-axis direction. The joint 51 has a movable range of about ±120 degrees from the initial posture.

The link 50 and the link 60 of the robot arm main body 200 are connected by the joint 61. The joint 61 has a rotation axis extending in the X-axis direction. The joint 61 has a movable range of about ±240 degrees from the initial posture.

As described above, in the present exemplary embodiment, the rotation axis of each of the joints 11, 41, and 61 is provided in parallel with the central axes (a dot-and-dash line in FIG. 2) of the respective two links connected by the joint, so that a (relative) angle around the rotation axis of these two links can be changed.

In contrast, the rotation axis of each of the joints 21, 31 and 51 is provided so that a (relative) angle formed by the intersecting central axes (the dot-and-dash line in FIG. 2) of the respective two links connected by the joint can be changed.

Further, a robot hand for performing an assembly task and a movement task in a production line is applied to the end effector 300 connected to the tip of the robot arm main body 200.

The end effector 300 is attached to the link 60 by a semi-fixing way such as screwing, or is attachable to the link 60 by an attachment/detachment way such as latching.

In particular, in a case where the end effector 300 is detachable, it is also possible to control the robot arm main body 200 such that another end effector 300 disposed at a supply position is detached/attached or replaced by the operation of the robot arm main body 200 itself.

Further, in the present exemplary embodiment, a torque sensor 230 and the encoder 220 are each disposed at each of the joints (FIG. 3) so that feedback control can be performed in driving the joints 11 to 61.

The wiring 250 is indicated by a broken line illustrated in FIG. 2. The wiring 250 is drawn out from the control device 400, and supplies electricity to the motor 210, the encoder 220, and the torque sensor 230 provided in each of the joints of the robot arm main body 200. The wiring 250 also supplies electricity to a drive mechanism (not illustrated) for opening and closing the finger portions of the end effector 300.

Figure 3:
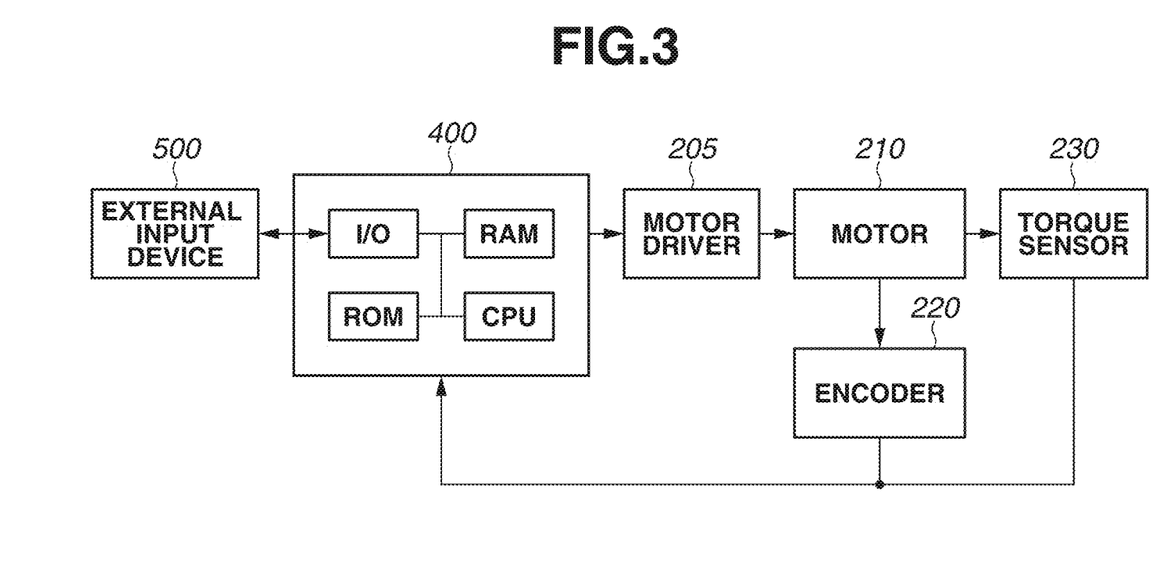
FIG. 3 is a control block diagram illustrating the robot system according to the first exemplary embodiment.

FIG. 3 is a control block diagram illustrating the robot system 1000 in the present exemplary embodiment. The control device 400 executes a control program described below to control each portion of the robot arm main body 200 and the end effector 300.

The end effector 300 is controlled by a configuration similar to the configuration in the block diagram illustrated in FIG. 2. The description will be provided below with reference to FIG. 2 and FIG. 3.

As illustrated in FIG. 3, the external input device 500 outputs a command value to the control device 400. The control device 400 generates a control value for the motor 210 provided in each of the joints 11 to 61 of the robot arm main body 200.

The control value of the robot arm main body 200 is supplied to the motor 210 provided in each of the joints of the robot arm main body 200, via a motor driver 205.

When the robot arm main body 200 operates, a value detected by each of the encoder 220 and the torque sensor 230 provided in each of the joints is returned to the control device 400. Feedback control for the robot arm main body 200 can be thereby performed.

The robot arm main body 200 in the present exemplary embodiment is an articulated robot having six axes, and a driving transmission system including a motor, a torque sensor, and an encoder is provided in each of the joints. These are appropriately controlled based on a task executed by the robot arm main body 200 and a movement locus of the robot arm main body 200.

Here, the motor 210, the torque sensor 230, and the encoder 220 are described as representatives for convenience of description. However, in actual operation, the driving transmission system of each of the joints is appropriately controlled to implement desired operation of the robot arm main body 200.

The encoder 220 and the torque sensor 230 described above are disposed at a predetermined position on a driving shaft of a driving system that includes the motor 210 placed inside each of the joints 11 to 61 or further includes a reduction gear (not illustrated) in addition to the motors.

When the motor 210 drives each of the joints 11 to 61 and thereby changes the angle of each of the links, the encoder 220 detects the position of the links changed by the driving, and the torque sensor 230 detects the value of a torque applied to the links.

The output of the encoder 220 and the torque sensor 230 is returned to the control device 400, and is fed back to the driving of each of the joints 11 to 61, so that control of the position and the torque in each of the links 10 to 60 can be performed.

Further, a force to be generated in the end effector 300 can be calculated from the value of each of the torque sensors 230. As the force generated in the end effector 300, a load applied to the workpiece Wa can be calculated and then fed back to the control device 400.

While details of the structure and the placement position of the encoder 220 and the torque sensor 230 are not illustrated, a known structure is utilized, and the detailed description thereof is omitted.

The ROM stores a control program for controlling drive units corresponding to the end effector 300 and the robot arm main body 200 for various operations, and data as well as setting values necessary for control of those drive units. The CPU loads such data, setting values, and control program that are necessary for control of the robot system 1000, into the RAM.

Further, the external input device 500 such as a teaching pendant is connected to the general-purpose input/output interface I/O. The user can thereby operate the robot arm main body 200, directly.

In the above-described configuration, a process in a position control mode for controlling the position of the end effector 300, and a process in a force control mode for controlling the applied load and the direction of the end effector 300 can be executed to control the robot arm main body 200.

The position control mode is a mode for controlling each of the joints 11 to 61 of the robot arm main body 200 so that the end effector 300 is moved to a position (coordinates XYZ in each of FIGS. 1A, 1B, and 1C) taught beforehand.

The encoder 220 and the torque sensor 230 described above are an example of a position detection unit and an example of a force detection unit, respectively, and other types of mechanism may be used where appropriate depending on intended use.

The force control mode is a mode for controlling each of the joints 11 to 61 of the robot arm main body 200 such that the force is constantly exerted when a command value about a force and a direction is provided to the end effector 300 instead of indicating a position, and the end effector 300 is moved in the direction.

As for a method for teaching the position of the end effector 300, mainly three patterns are conceivable. The first pattern is a method for calculating the position from the dimensions of each device design of the robot system 1000.

The second pattern is a method for teaching the position suitable for an actual workpiece by actually using the robot system 1000. The position is taught corresponding to actual workpieces by changing the posture of the robot arm main body 200 using a device such as the external input device 500.

The third pattern is a method for teaching the position as follows. First, the robot arm main body 200 is brought into a state where the robot arm main body 200 is controlled to change the posture in response to an external force, by using a detection value of the torque sensor 230 of the robot arm main body 200. Next, a user directly applies a force to the robot arm main body 200, and thereby changes the posture.

Next, a method for controlling assembly operation using the above-described robot system 1000 will be described in detail.

Figure 4:
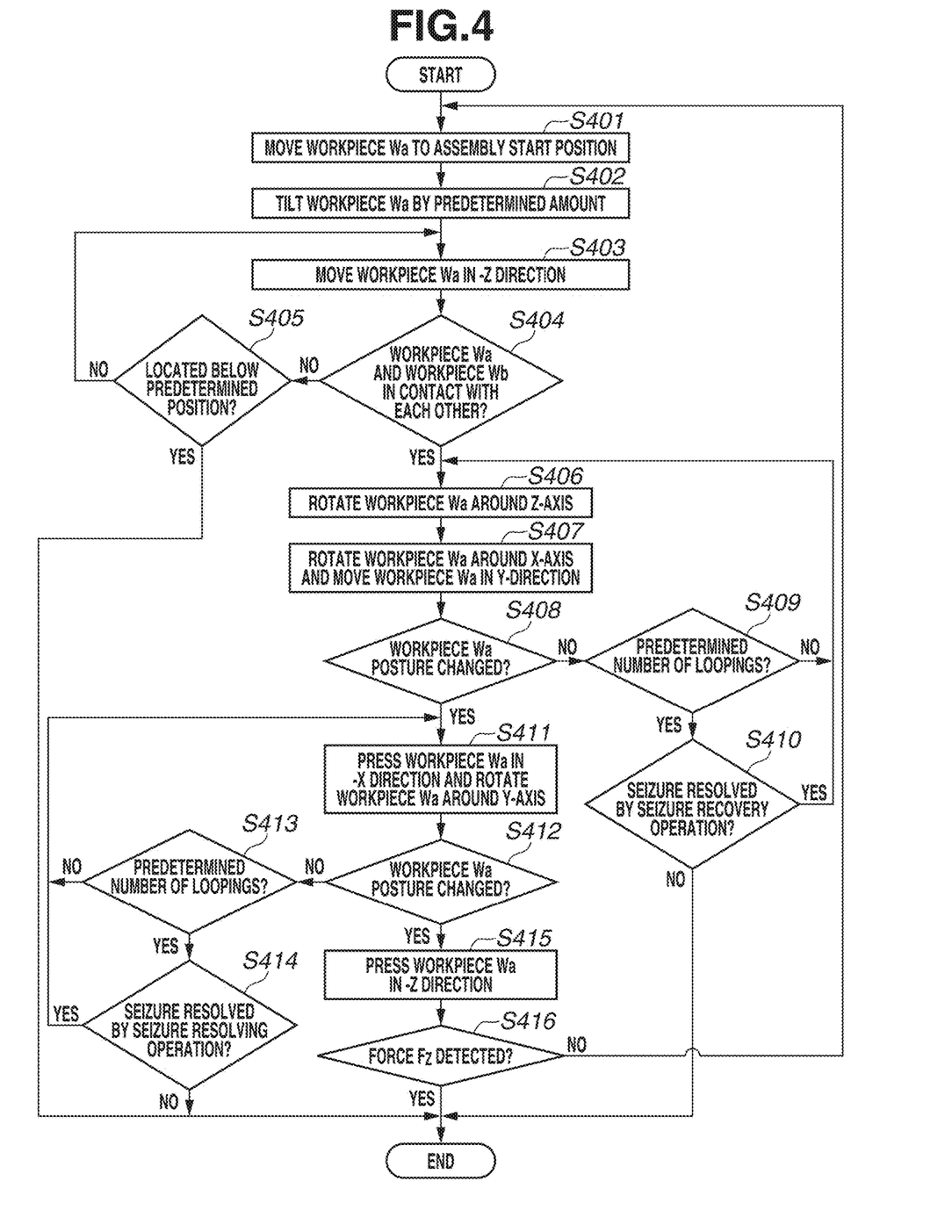
FIG. 4 is a control flow chart according to the first exemplary embodiment.

FIG. 4 illustrates a flowchart for performing the assembly operation in the present exemplary embodiment. FIGS. 5A to 5I are state diagrams each illustrating a step in the flow in FIG. 4. The description will be provided below with reference to FIG. 4 and FIGS. 5A to 5I.

The description with reference to FIG. 4 starts from a following state, which is a precondition. First, the workpiece Wa is already held in a predetermined posture by the end effector 300, and positioned above the workpiece Wb. The workpiece Wb is placed and fixed onto a mounting table (not illustrated).

In FIGS. 5A to 5I, illustration of the end effector 300 and the robot arm main body 200 is omitted, and only movements of the workpiece Wa and the workpiece Wb are illustrated and will be described for simplification of the description. In addition, coordinates 801 are local coordinates of the end effector 300, and coordinates 802 are world coordinates that indicate a position of the end effector 300 in the entire robot system 1000.

The workpiece Wa is tilted by using the coordinates 801, and the workpiece Wa is moved to a predetermined position in any space by using the coordinates 802.

Figure 5A:
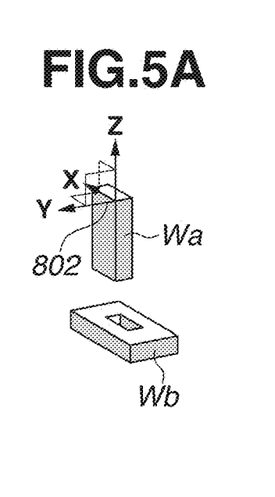
FIGS. 5A to 5I are state diagrams illustrating steps in FIG. 4.

As illustrated in FIG. 4, first, in step S401, the workpiece Wa is moved to an assembly start position above the workpiece Wb (FIG. 5A). Whether the workpiece Wa has been moved to the assembly start position is determined based on a detection value of the encoder 220.

Figure 5B:
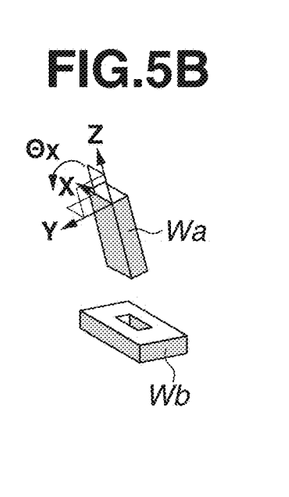

Next, in step S402, the workpiece Wa is tilted in a predetermined amount by tilting the end effector 300 in a predetermined amount. First, the posture of the workpiece Wa is changed by issuing a command to the robot arm main body 200 to rotate around the X-axis of the coordinates 801 by a predetermined angle $\Theta_X$ in the position control mode (FIG. 5B).

Figure 5C:
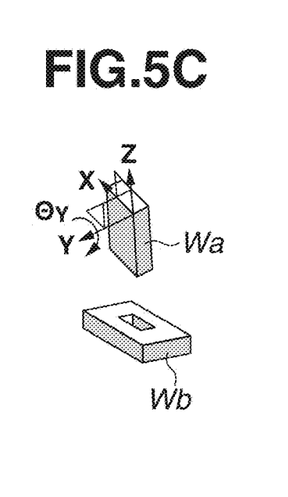

Next, the posture of the workpiece Wa is changed by issuing a command to the robot arm main body 200 to rotate around the Y-axis of the coordinates 802 by a predetermined angle $\Theta_Y$ in the position control mode (FIG. 5C).

Figure 5D:
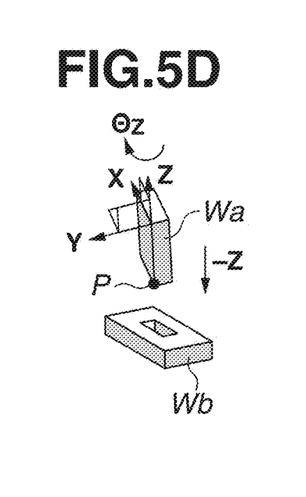

Next, the posture of the workpiece Wa is changed by issuing a command to the robot arm main body 200 to rotate around the Z-axis of the coordinates 802 by a predetermined angle $\Theta_Z$ in the position control mode (FIG. 5D).

Since the posture is changed in the manner described above, a predetermined corner portion P of the workpiece Wa is located at the lowest position in the Z-axis of the coordinates 801, and placed at a position closest to the workpiece Wb.

In the present exemplary embodiment, positioning of the corner portion P is roughly performed, and each rotation angle needs to be large to some extent and needs to be about 15 degrees to 25 degrees. The corner portion P of the workpiece Wa can thereby be reliably brought to the lowest position in the Z-axis of the coordinates 801.

This makes it unnecessary to place the workpiece Wa at an exact position to hold the workpiece Wa with high reproducibility, and thus makes it unnecessary to use a positioning device for the workpiece Wa. The cost of the robot system 1000 can be thereby reduced.

Next, in step S403, the workpiece Wa is brought close to the workpiece Wb, by issuing a command value to the robot arm main body 200 to move the workpiece Wa in the −Z direction of the coordinates 801. In this process, the control mode of the robot arm main body 200 is the force control mode.

Figure 5E:
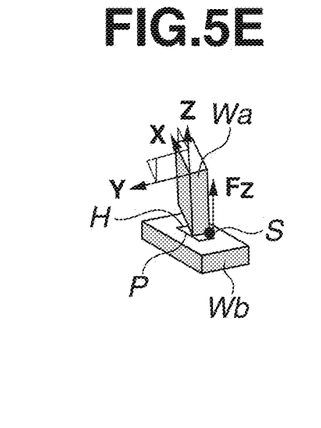

As a result of moving the workpiece Wa in the −Z direction, the workpiece Wa and the workpiece Wb come in contact with each other at an S point. At this moment, in a state where the corner portion P is inserted into an opening portion H of the workpiece Wb, a force Fz is generated in the Z direction at the S point (FIG. 5E). In step S404, the force Fz is detected by using the torque sensor 230 of the robot arm main body 200.

If the force Fz is not detected (NO in step S404), the operation proceeds to step S405. In step S405, whether the workpiece Wa is located below a predetermined position in the Z-axis is determined. If the workpiece Wa is not located below the predetermined position (NO in step S405), the operation returns to the state immediately before step S403 to move the workpiece Wa again.

If the workpiece Wa is located below the predetermined position (YES in step S405), it is determined that a task is being performed at a position where the workpiece Wb and the workpiece Wa are not in contact with each other for some reason. This status is determined as an assembly failure, so that the task is suspended and thus the operation ends. As a reason for this contact detection failure, it is conceivable that, for example, the operation is continuing after the end effector 300 has dropped the workpiece Wa, or the workpiece Wb is not placed at the predetermined position.

If the force Fz is detected (YES in step S404), the workpiece Wa and the workpiece Wb are determined to be in contact with each other at the predetermined position and the operation proceeds to step S406.

Figure 5F:
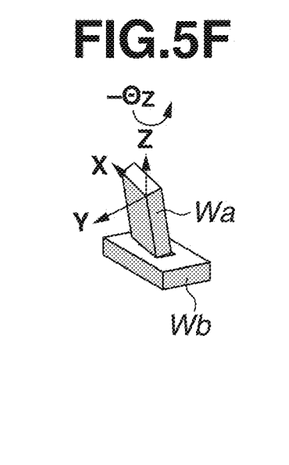

In step S406, a command is issued to the robot arm main body 200 to rotate the workpiece Wa around the Z-axis. In this process, an angle $-\Theta_Z$ opposite to the angle $\Theta_Z$ of the rotation in step S402 is indicated by the command as a rotation angle, so that the workpiece Wa is rotated to return to the previous posture (FIG. 5F).

Figure 5G:
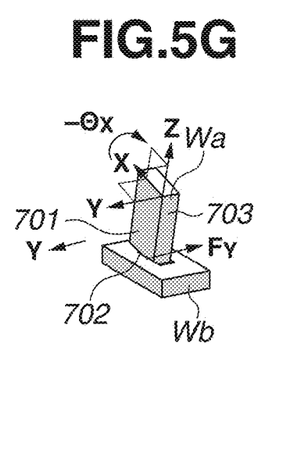

Subsequently, in step S407, a command for rotating the workpiece Wa around the X-axis of the coordinates 802 indicating a value $-\Theta_X$ opposite to the value of the rotation angle $\Theta_X$ indicated in step S402, and a command for moving the workpiece Wa in the Y direction of the coordinates 802 are issued to the robot arm main body 200 (FIG. 5G).

For example, the command issued for movement in the Y direction of the coordinates 802 might indicate continuing the movement until a force Fy of 10 N is detected.

As a result, a state where a part of a surface 701 of the workpiece Wa and a part of an inner surface 702 of the opening portion H are in contact with each other at the corner portion P, can be changed to a state where both surfaces of the workpieces are in contact with each other and the workpiece Wa and the workpiece Wb coincide with each other.

In this case, if a component is rectangular such as the workpiece Wa, when the contact starts from a longer side such as the surface 701, rather than a surface 703, an assembly process becomes easier and more reliable, which is desirable.

In step S408, it is determined whether the posture change of the workpiece Wa is completed such that the part of the surface 701 is in contact and coincides with the part of the inner surface 702 of the workpiece Wb.

As a method for the determination, if an amount of the posture change of the workpiece Wa has reached a threshold within a predetermined time, it is determined that the posture change of the workpiece Wa is completed (YES in step S408), and the operation proceeds to step S411. The absolute value of each of the angles $\Theta_X$ and $\Theta_Z$ when the posture is changed in step S402 is set as the threshold.

If the amount of the posture change of the workpiece Wa has not reached the threshold within the predetermined time (NO in step S408), the operation proceeds to step S409.

In step S409, it is determined whether the current number of loopings from step S406 to step S409 is a predetermined number. If the number of loopings is smaller than the predetermined number (NO in step S409), the operation returns to the state immediately before step S406 to perform the operation for changing the posture of the workpiece Wa again.

If the number of loopings has reached the predetermined number, it is determined that the posture cannot be changed for some reason. A conceivable reason why the posture of the workpiece Wa cannot be changed is the occurrence of seizure between the workpiece Wa and the workpiece Wb.

A conceivable cause of the seizure is that the workpiece Wa may have been deeply inserted into the workpiece Wb before the parts of the surfaces of the respective workpieces Wa and Wb coincided with each other. As a result of this insertion, the workpiece Wa gets stuck within the opening portion H of the workpiece Wb, and the posture cannot be changed.

If the number of loopings has reached the predetermined number (YES in step S409), the operation proceeds to step S410. In step S410, operation for recovery from the seizure state is performed.

For example, a command value is provided in a direction opposite to the direction indicated by the value of the initial command in the force control mode, the force control mode is switched to the position control mode, and a command value in the +Z direction of the coordinates 801 is given. The workpiece Wa can be thereby released from the opening portion H, so that the seizure can be resolved.

If the workpiece Wa can be returned to a predetermined position in the Z direction of the coordinates 801 within a set time, it is determined that the seizure is resolved (YES in step S410), and the operation returns to the state immediately before step S406. In this process, the number of loopings determined in step S409 is reset.

If the workpiece Wa cannot be returned to the predetermined position within the set time, it is determined that the seizure cannot be resolved (NO in step S410). In this case, it is determined that an assembly failure has occurred, so that the task is suspended and the operation ends.

Figure 5H:
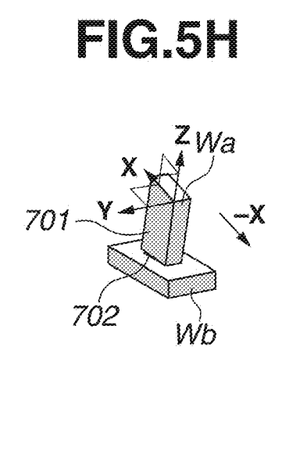

If the posture change of the workpiece Wa is completed (YES in step S408), the operation proceeds to step S411. In step S411, first, a command for moving the workpiece Wa in the −X direction of the coordinates 802 is output to the robot arm main body 200 (FIG. 5H). The output command indicates, for example, a command value for moving the workpiece Wa in the −X direction of the coordinates 802 until a force of 10 N is detected. In this process, the robot arm main body 200 moves the workpiece Wa while maintaining contact between the surface 701 of the workpiece Wa and the inner surface 702 of the opening portion H of the workpiece Wb.

Figure 5I:
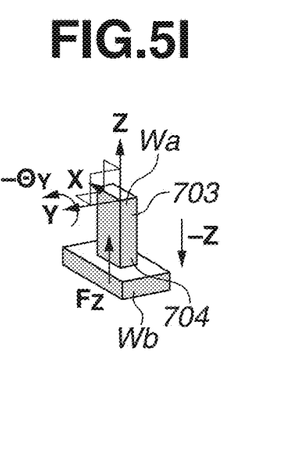

Next, a command for rotating in the Y-axis of the coordinates 802 is issued to the robot arm main body 200 (FIG. 5I). The command for the rotating around the Y-axis of the coordinates 802 indicates a value $-\Theta_Y$ that is a value opposite to the rotation angle $\Theta_Y$ of the command in step S402. The posture of the workpiece Wa is thereby changed to the same posture as the posture in step S401.

Subsequently, in step S412 and step S413, it is determined whether the angle of the workpiece Wa has been changed within a predetermined time in a manner similar to step S408 and step S409, based on the number of loopings from step S411 to step S413.

If the number of loopings has reached the predetermined number (YES in step S413) and thereby a seizure between the workpiece Wa and the workpiece Wb is detected, the operation proceeds to step S414. In step S414, operation for recovery from the seizure state is performed in a manner similar to step S410. If the recovery from the seizure state is successfully performed (YES in step S414), the operation returns to the state immediately before step S411 to perform the operation for changing the posture of the workpiece Wa again. If it is determined that the recovery from the seizure state cannot be performed (NO in step S414), the assembly is ended.

The above process brings the workpiece Wa and the workpiece Wb into a state where a part of the surface 703 of the workpiece Wa and an inner surface 704 of the opening portion H of the workpiece Wb are in contact with each other. As a result, the posture of the workpiece Wa and the opening portion H of the workpiece Wb coincide with each other in terms of phase. Here, a part of the surfaces of the workpiece Wa and the workpiece Wb which are in contact with each other is a two-dimensional area.

Subsequently, in step S415, a command for moving the workpiece Wa in the −Z direction of the coordinates 801 is issued to the robot arm main body 200, so that the workpiece Wa is pressed in the −Z direction and thereby inserted into the workpiece Wb.

Subsequently, in step S416, it is determined whether a predetermined force Fz due to the pressing operation in step S415 is detected. If the force Fz is detected (YES in step S416), it is determined that the assembly has been successfully completed, and the operation is ended. If the force Fz is not detected (NO in step S416), the operation returns to the state immediately before step S401 to perform the fitting of the workpiece Wa again.

In step S416, in the present exemplary embodiment, the completion of the assembly is determined based on the detection of the predetermined force, but this is not limitative. For example, the completion of the assembly may be determined based on whether the position of the workpiece Wa is located at a predetermined position in the coordinates 801.

Moreover, in step S416, because the workpiece Wa is fitted into the workpiece Wb, the posture should be restricted, and thus the posture change of the workpiece Wa should be small. Therefore, the completion of the assembly is determined by applying a force in the direction of each of the X, Y, and Z axes of the coordinates 802 in the force control mode. The fitting is determined to be successful, if a change in the posture of the workpiece Wa when the force is applied in the direction of each of the X, Y, and Z axes of the coordinates 802 is equal to or smaller than a threshold. The fitting is determined to be unsuccessful, if the change in the posture of the workpiece Wa is larger than the threshold.

In step S408 and step S412 described above, the posture change of the workpiece Wa is determined based on the angular amount of the posture-changed workpiece Wa, but this is not limitative. For example, the determination may be made as follows. First, the robot arm main body 200 is set in the force control mode, and a command value for applying a force in a direction perpendicular to the contacting surface is given. If a load imposed on the workpiece Wa rises without a movement of the workpiece Wa in the perpendicular direction, it can be determined that a part of a surface of the workpiece Wa and a part of a surface of the workpiece Wb are in contact with each other.

As described above, according to the present exemplary embodiment, when the workpieces are assembled, the parts of the surfaces of both the workpiece Wa serving as a fitting component and the workpiece Wb serving as a component to be fitted into are brought into contact with each other, so that the relative positions of both are aligned at the time of the insertion. The relative positions at the time of the insertion can be thereby aligned reliably, irrespective of the shape of the corner portion of the workpiece Wa and without use of a positioning device for the workpiece Wa. Therefore, a chance of success in assembling the workpieces can be increased without an increase in cost.

Further, while a part of a first surface of the workpiece Wa and a part of a first surface of the workpiece Wb are in contact with each other, a part of a second surface of the workpiece Wa and a part of a second surface of the workpiece Wb are brought into contact with each other. This can reduce a probability that the workpiece Wa overrides the workpiece Wb when the posture of the workpiece Wa returns to the previous state. Therefore, the probability of success in assembling the workpieces can be further increased.

Specifically, the processing procedure of the first exemplary embodiment described above is executed by the control device 400. Therefore, a software control program that can execute the above-described functions and a storage medium that stores the program are included in the present exemplary embodiment.

Further, in the above-described exemplary embodiment, a computer-readable storage medium is the ROM or RAM which stores the control program, but the present disclosure is not limited to such a case. The control program for implementing the present exemplary embodiment may be recorded in any type of storage medium, if the storage medium is the computer-readable storage medium. The storage media for supplying the control program are, for example, a hard disk drive (HDD), an external storage device, and a recording disk.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Other Embodiments

In the first exemplary embodiment, the case where the workpiece Wa is placed after positioning thereof has already been performed to some extent is described as an example, but this is not limitative. For example, there can be a case where the workpieces Wa are provided as bulk supply.

In this case, it is difficult to manage the position of a corner portion of the workpiece Wa. Therefore, the position and the posture of the workpiece Wa that can be held by the end effector 300, is recognized from among the workpieces Wa in the bulk using an imaging apparatus such as a camera, to perform a holding operation.

This makes it unnecessary to perform a task of placing the workpiece Wa individually and therefore, a further reduction in the cost of the robot system can be expected.

The confirmation of the positioning of the corner portion P performed in step S402 in the first exemplary embodiment can be performed using an imaging apparatus.

In the first exemplary embodiment described above, the robot arm main body 200 is a six-joint robot having six joints, but the number of joints is not limited to six. The robot arm main body 200 is a type that has a perpendicular multiple-axis configuration. However, a configuration similar to the above-described configuration can be implemented in the joints of the robot arm main body 200 of a different type such as a parallel link type.

Further, in the first exemplary embodiment described above, the part of the surface of the workpiece Wa is brought into contact with the part of the inner surface of the opening portion H in the workpiece Wb in step S406 to step S415, by using the angular amount having the same absolute value as the angular amount of the tilt in step S402. However, this is not limitative. For example, step S406 to step S415 can be performed by issuing a command for rotating the workpiece Wa until a predetermined force in a predetermined direction is detected when the surfaces of the respective workpieces are brought into contact with each other. In this case, the amount of the tilt in step S402 and the amount of the tilt in step S406 to S415 may be different. In other words, the assembling of the workpieces is possible even if the positional relationship between the workpieces in step S401 varies to some extent.

Furthermore, the exemplary embodiment described above is applicable to a machine that can automatically perform operation of expansion and contraction, bending and stretching, vertical movement, horizontal movement, rotation, or a combination of any of these operations, based on information in a storage unit provided in a control device.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-116498, filed Jun. 19, 2018, which is hereby incorporated by reference herein in its entirety.

What is claimed is:

1. A robot system that performs a task while maintaining contact between a first object and a second object, the robot system comprising:
a robot; and
a control device configured to control the robot system, wherein the control device is configured to operate the first object by the robot, and configured to, after bringing a part of a second surface of the first object and a part of a second surface of the second object into contact with each other by moving the first object in a direction in which the part of the second surface of the first object and the part of the second surface of the second object come close to each other while maintaining a state where a part of a first surface of the first object is along a part of a first surface of the second object, bring the part of the second surface of the first object along the part of the second surface of the second object by executing a rotation to rotate the first object around an axis extending in a direction along with the second surface of the first object or the second object while pressing the part of the second surface of the first object against the part of the second surface of the second object.

2. The robot system according to claim 1, wherein the control device inserts the first object into the second object, while maintaining a state where the part of the first surface of the first object and the part of the first surface of the second object are in contact with each other, and the part of the second surface of the first object and the part of the second surface of the second object are in contact with each other.

3. The robot system according to claim 1, wherein the control device is configured to rotate the first object when bringing the part of the first surface of the first object and the part of the first surface of the second object into contact with each other.

4. The robot system according to claim 1, wherein the control device is configured to tilt the first object by a predetermined amount by operating the robot, and when the first object is tilted by the predetermined amount, the first object is tilted so as to bring a predetermined corner portion of the first object to a position closest to the second object.

5. The robot system according to claim 1,
wherein the part of the first surface of the first object is a two-dimensional area, and
wherein the part of the first surface of the second object is a two-dimensional area.

6. The robot system according to claim 1, wherein the first object is operated by the robot, and the part of the second surface of the first object and the part of the second surface of the second object are brought into contact with each other by moving the first object in a direction in which the part of the second surface of the first object and the part of the second surface of the second object come close to each other while maintaining a state where the part of the first surface of the first object is along the part of the first surface of the second object and not rotating the first object.

7. The robot system according to claim 1, wherein the control device is configured to determine that a contact interference occurs between the first object and the second object in a case where an amount of change in posture of the first object does not reach a threshold even if the rotation is executed a predetermined number of times, and separate the first object from the second object.

8. The robot system according to claim 7, wherein the control device is configured to stop the robot in a case where the first object cannot be moved to a predetermined position within a predetermined time when the control device is separating the first object from the second object.

9. The robot system according to claim 1, further comprising:
a force detection unit configured to detect a force,
wherein the control device is configured to bring the part of the second surface of the first object and the part of the second surface of the second object into contact with each other by moving the first object in a direction in which the part of the second surface of the first object and the part of the second surface of the second object come close to each other while maintaining a state where the part of the first surface of the first object is along the part of the first surface of the second object based on a detection value of the force detection unit.

10. The robot system according to claim 1, wherein the second object includes an opening, and the first surface and the second surface of the second object are surfaces to form the opening.

11. The robot system according to claim 1, wherein the robot includes a robot arm and an end effector.

12. A control method for a robot system that performs a task while maintaining contact between a first object and a second object, the robot system including
a robot, and
a control device configured to control the robot system,
the control method comprising:
operating the first object by the robot, and after bringing a part of a second surface of the first object and a part of a second surface of the second object into contact with each other by moving the first object in a direction in which the part of the second surface of the first object and the part of the second surface of the second object come close to each other while maintaining a state where a part of a first surface of the first object is along a part of a first surface of the second object, bringing the part of the second surface of the first object along the part of the second surface of the second object by executing a rotation to rotate the first object around an axis extending in a direction along with the second surface of the first object or the second object while pressing the part of the second surface of the first object against the part of the second surface of the second object.

13. The control method according to claim 12, wherein, in the second contact, the control device is configured to rotate the first object after the part of the first surface of the first object and the part of the first surface of the second object are brought into contact with each other.

14. The control method according to claim 12, wherein the control device is configured to tilt the first object by a predetermined amount by operating the robot, and when performing the tilting, the first object is tilted to bring a predetermined corner portion of the first object to a position closest to the second object.

15. A non-transitory computer-readable storage medium that stores the control method according to claim 12.

16. An article manufacturing method using a robot system that performs a task while maintaining contact between a first object and a second object, the robot system including:
a robot; and
a control device configured to control the robot system,
the article manufacturing method comprising:
operating the first object by the robot, and, after bringing a part of a second surface of the first object and a part of a second surface of the second object into contact with each other by moving the first object in a direction in which the part of the second surface of the first object and the part of the second surface of the second object come close to each other while maintaining a state where a part of a first surface of the first object is along a part of a first surface of the second object, bringing the part of the second surface of the first object along the part of the second surface of the second object by executing a rotation to rotate the first object around an axis extending in a direction along with the second surface of the first object or the second object while pressing the part of the second surface of the first object against the part of the second surface of the second object; and
inserting the first object into the second object.

17. The article manufacturing method according to claim 16, wherein, in the inserting process, the control device inserts the first object into the second object, while maintaining a state where the part of the first surface of the first object and the part of the first surface of the second object are in contact with each other, and the part of the second surface of the first object and the part of the second surface of the second object are in contact with each other.

18. A robot system that performs a task while maintaining contact between a first object and a second object, the robot system comprising:
a robot; and
a control device configured to control the robot system,
wherein the control device is configured to operate the first object by the robot, and configured to, before bringing a part of a second surface of the first object and a part of a second surface of the second object into contact with each other by moving the first object in a direction in which the part of the second surface of the first object and the part of the second surface of the second object come close to each other while maintaining a state where a part of a first surface of the first object is along a part of a first surface of the second object, bring the part of the first surface of the first object along the part of the first surface of the second object by executing a rotation to rotate the first object around an axis extending in a direction along with the first surface of the first object or the second object while pressing the part of the first surface of the first object against the part of the first surface of the second object.

19. The robot system according to claim 18, wherein the control device is configured to determine that a contact interference occurs between the first object and the second object in a case where an amount of change in posture of the first object does not reach a threshold even if the rotation is executed a predetermined number of times, and separate the first object from the second object.

20. The robot system according to claim 19, wherein the control device is configured to stop the robot in a case where the first object cannot be moved to a predetermined position within a predetermined time when the control device is separating the first object from the second object.

21. A control method for a robot system that performs a task while maintaining contact between a first object and a second object, the robot system including a robot, and
a control device configured to control the robot system,
the control method comprising:
operating the first object by the robot, and, before bringing a part of a second surface of the first object and a part of a second surface of the second object into contact with each other by moving the first object in a direction in which the part of the second surface of the first object and the part of the second surface of the second object come close to each other while maintaining a state where a part of a first surface of the first object is along a part of a first surface of the second object, bringing the part of the first surface of the first object along the part of the first surface of the second object by executing a rotation to rotate the first object around an axis extending in a direction along with the first surface of the first object or the second object while pressing the part of the first surface of the first object against the part of the first surface of the second object.

* * * * *